(12) United States Patent
Tenny

(10) Patent No.: US 8,391,878 B2
(45) Date of Patent: Mar. 5, 2013

(54) METHOD AND APPARATUS FOR REINFORCEMENT OF BROADCAST TRANSMISSIONS IN MBSFN INACTIVE AREAS

(75) Inventor: Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 687 days.

(21) Appl. No.: 12/444,578

(22) PCT Filed: Nov. 6, 2007

(86) PCT No.: PCT/US2007/083820
§ 371 (c)(1),
(2), (4) Date: Jun. 30, 2009

(87) PCT Pub. No.: WO2008/058149
PCT Pub. Date: May 15, 2008

(65) Prior Publication Data
US 2010/0056166 A1   Mar. 4, 2010

Related U.S. Application Data

(60) Provisional application No. 60/864,779, filed on Nov. 7, 2006.

(51) Int. Cl.
*H04B 15/00* (2006.01)
*H04W 72/00* (2009.01)

(52) U.S. Cl. .......................................... 455/450; 455/62

(58) Field of Classification Search .................. 455/466, 455/502, 445, 456.1, 422.1, 561, 412.2, 435.1, 455/403, 522; 370/330, 395.52, 312, 468, 370/342, 328, 352, 335
See application file for complete search history.

(56) References Cited

U.S. PATENT DOCUMENTS

| | | | |
|---|---|---|---|
| 2004/0131026 A1 | 7/2004 | Kim et al. | |
| 2005/0041608 A1 | 2/2005 | Jeong et al. | |
| 2005/0118992 A1 | 6/2005 | Jeong et al. | |
| 2006/0003779 A1* | 1/2006 | Lekutai | 455/466 |
| 2007/0116011 A1* | 5/2007 | Lim et al. | 370/395.52 |
| 2007/0249380 A1* | 10/2007 | Stewart et al. | 455/502 |

FOREIGN PATENT DOCUMENTS

| | | |
|---|---|---|
| EP | 1635594 | 3/2006 |
| JP | 2008530877 A | 8/2008 |
| RU | 2259016 | 8/2005 |
| RU | 2264036 | 11/2005 |
| RU | 2006103373 | 9/2006 |
| WO | WO2005043829 | 5/2005 |
| WO | WO2005122517 | 12/2005 |

OTHER PUBLICATIONS

International Search Report and Written Opinion, PCT/US2007/083820, International Searching Authority, European Patent Office, Apr. 28, 2008.

(Continued)

*Primary Examiner* — Kiet Doan
(74) *Attorney, Agent, or Firm* — John J. Ketchum

(57) ABSTRACT

A method for a wireless communication system includes broadcasting that a first service is available in a first MBSFN and a second service is available in a second MBSFN. The method includes supporting a service not broadcasted as available. For example, supporting the first service with the second MBSFN and/or supporting the second service with the first MBSFN. The supporting or reinforcing can be done by echoing. The echoing is scheduled along with the owned service.

20 Claims, 13 Drawing Sheets

SFN inactive area

OTHER PUBLICATIONS

3GPP TR3.018 V.0.6.0: 3rd Generation Partnership Project: Technical Specification Group Radio Access Network; Evolved UTRA and UTRAN; Radio Access Architecture and Interfaces (Release 7), (Online) Oct. 2006, pp. 1-121, XP002476245.

TSG-RAN Working Group 3 Meeting #53BIS: Revised Draft Report of 3GPP TSG RAN WG3 Meeting #53BIS, (Online) vol. R3-061621, Oct. 13, 2006, pp. 1-5, 12-13, XP002476246.

Ericsson: "SFN area configuration for E-MBMS" 3GPP TSG-RAN WG3 Meeting #53BIS, Oct. 13, 2006 pp. 1-3, XP002476247.

3GPP: "3rd Generation Partnership Project; Technical Specification Group Radio Access Network; Introduction of the Multimedia Broadcast Multicast Service (MBMS) in the Radio Access Network (Stage-2); (Release 6); 3GPP TS 25.346 v 1 . 1 .0", 3GPP TS 25.346 V 1.1.0 , XX, XX, May 1, 2002, pp. 1-11, XP002260225.

Mitsubishi Electric, "Semi-static and Dynamic SFN areas for MBMS Services", R3-061510, 3GPP TSG RAN WG3 Meeting #53bis, Seoul, Korea Oct. 10-13, 2006, 4 pages.

Panasonic, "eMBMS Content Distribution", R3-061469, 3GPP TSG RAN WG3 Meeting #53bis Seoul, South Korea, Oct. 10-13, 2006, 3 pages.

Taiwan Search Report—TW096142177—TIPO—Jan. 5, 2012.

Motorola: "SFN areas and the MBMS coordinating function", 3GPP TSG-RAN WG3 Meeting #53bis, R3-061549, Oct. 2006.

* cited by examiner

Interference at the boundary of an SFN area

SFN inactive area

Three SFN areas meeting at a point

Duplication of SFN transmissions at a triple point

Scheduling of services in separate resource blocks

A larger group of cells (shading represent local SFN areas)

METHOD AND APPARATUS FOR REINFORCEMENT OF BROADCAST TRANSMISSIONS IN MBSFN INACTIVE AREAS

CROSS-REFERENCE TO RELATED APPLICATIONS

This application claims the benefit of U.S. Provisional Patent application Ser. No. 60/864,779 entitled "A METHOD AND APPARATUS FOR REINFORCEMENT OF BROADCAST TRANSMISSIONS IN SFN INACTIVE AREAS" which was filed Nov. 7, 2006. The entirety of the aforementioned applications is herein incorporated by reference.

BACKGROUND

I. Field

The following description relates generally to wireless communications, and more particularly to providing a mechanism for reusing the idled radio resources in the MBSFN inactive area to contribute to the adjacent MBSFN transmissions.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, 3GPP LTE systems, orthogonal frequency division multiplexing (OFDM), localized frequency division multiplexing (LFDM), orthogonal frequency division multiple access (OFDMA) systems, and the like.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beam forming gain on the forward link when multiple antennas are available at the access point.

In a wireless communication system, a Node B (or base station) may transmit data to a user equipment (UE) on the downlink and/or receive data from the UE on the uplink. The downlink (or forward link) refers to the communication link from the Node B to the UE, and the uplink (or reverse link) refers to the communication link from the UE to the Node B. The Node B may also send control information (e.g., assignments of system resources) to the UE. Similarly, the UE may send control information to the Node B to support data transmission on the downlink and/or for other purposes.

In Multicast/Broadcast Single Frequency Network (MBSFN) transmissions of multicast or broadcast services (e.g., MBMS), the coverage of service is limited by interference at the edge of the MBSFN transmission area. To minimize this problem, current designs call for a "buffer zone" of cells at the edge of the area that do not transmit on the radio resources used for the MBSFN transmission. The radio resources in this buffer zone are currently under utilized.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with an aspect, a method for a wireless communication system includes broadcasting that a first service is available in a first MBSFN area and a second service is available in a second MBSFN area. The method includes supporting a service not indicated as available. The supporting or reinforcing can be done by "echoing", e.g., transmitting the content of a service in a cell where it would not otherwise be transmitted. The echoing is scheduled along with the owned service in one aspect. By owned, it is meant the service belongs to and is advertised as available in a MBSFN area. For example, the first service is owned by the first MBSFN area, and the owned service is broadcast to the subscribing mobile devices in all cells of the first MBSFN area, optionally including the border cells, but the second service is not broadcast in the first MBSFN area. In this aspect of the invention, instead of idling radio resources associated with the second service in the border cells, the border cells can broadcast the second service to strengthen the transmission of the second service in nearby cells of the second MBSFN area. The providers of the MBSFN services can be two different companies or two different network entities, so the indications that a first service is available in a first MBSFN and a second service is available in a second MBSFN may be transmitted by different parties and/or at different times. In addition, one service or both services need not be indicated as available in the border cells.

In accordance with an aspect, a processor is configured for using a border area between at least two adjacent MBSFN transmission areas, the border area belonging to a first MBSFN transmission area and the processor is configured to support a transmission from another MBSFN. The transmission can be a service such as a Multimedia Broadcast and Multicast Service (MBMS) service. The service can be a service that the first MBSFN does not advertise as offering. The support can be dynamically altered or changed based upon network conditions or subscriber factors such as demographics, location of the subscriber and/or a number of current subscribers. For example, the support can be only initiated when there are more than a threshold number of subscribers that can benefit. In one aspect, a method can include transmitting both a service that the MBSFN does not advertise as having and a service that the MBSFN does advertise as having. In another aspect, an apparatus operable in a wireless communication system including a plurality of cells, the apparatus includes means for reusing an idled radio resource in an MBSFN inactive area to contribute to an adjacent MBSFN transmission; and means for carrying additional transmissions in each of the cells. In still another aspect, the apparatus includes a mobile device including a processor configured to receive from a border area belonging to a first MBSFN area a transmission echoing a service being transmitted in a second MBSFN area. In an aspect a computer program product is provided that includes a computer-readable medium including code for reusing an idled radio resource in an MBSFN inactive area to contribute to an adjacent MBSFN transmission.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
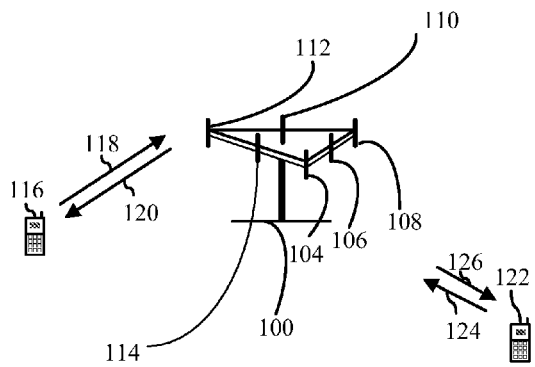
FIG. 1 illustrates a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In accordance with an aspect, a method for a wireless communication system includes broadcasting that a first service is available in a first MBSFN and a second service is available in a second MBSFN. The method includes supporting a service not broadcasted as available. For example, supporting the first service with the second MBSFN and/or supporting the second service with the first MBSFN. The supporting or reinforcing can be done by echoing. The echoing is scheduled along with the owned service. For example, the first service is owned by the first MBSFN, and the owned service is broadcast to the subscribing mobile devices, but when a device subscribing to the service of the second MBSFN is near the first MBSFN, instead of idling the border cells, the border cells can both broadcast the first service and can also broadcast the second service to strengthen the second service. Of course the providers of the MBSFNs can be two different companies so the broadcasting that a first service is available in a first MBSFN and a second service is available in a second MBSFN may be done by different parties and/or at different times. In addition, one service need not be broadcast as available.

In addition, various aspects of the disclosure are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems, and apparatuses described herein are described in the context of an ad-hoc or unplanned/semi-planned deployed wireless communication environment that provides repeating ACK channel in an orthogonal system. One skilled in the art should appreciate that similar techniques could apply to other communication environments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels, and various other media capable of storing, containing, and/or carrying instruction(s) and/or data.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The transmission reinforcing techniques described herein may be used for various wireless communication systems such as CDMA, TDMA, FDMA, OFDMA, and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (W-CDMA) and Low Chip Rate (LCR). Cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), IEEE 802.11, IEEE 802.16, IEEE 802.20, Flash-OFDMO, etc. These various radio technologies and standards are known in the art.

UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). Cdma2000 is described in documents from an organization named "3rd Generation Partnership Project 16" (3GPP2). For clarity, certain aspects of the techniques are described below for uplink transmission in LTE, and 3GPP terminology is used in much of the description below.

LTE utilizes orthogonal frequency division multiplexing (OFDM) on the downlink and single-carrier frequency division multiplexing (SC-FDM) on the uplink. OFDM and SC-FDM partition the system bandwidth into multiple (N) orthogonal subcarriers, which are also commonly referred to as tones, bins, etc. Each subcarrier may be modulated with data. In general, modulation symbols are sent in the frequency domain with OFDM and in the time domain with SC-FDM. For LTE, the spacing between adjacent subcarriers may be fixed, and the total number of subcarriers (N) may be dependent on the system bandwidth. In one design, N=512 for a system bandwidth of 5 MHz, N=1024 for a system bandwidth of 10 MHz, and N=2048 for a system bandwidth of 20 MHz. In general, N may be any integer value.

The system may support a frequency division duplex (FDD) mode and/or a time division duplex (TDD) mode. In the FDD mode, separate frequency channels may be used for the downlink and uplink, and downlink transmissions and uplink transmissions may be sent concurrently on their separate frequency channels. In the TDD mode, a common frequency channel may be used for both the downlink and uplink, downlink transmissions may be sent in some time periods, and uplink transmissions may be sent in other time periods. The LTE downlink transmission scheme is partitioned by radio frames (e.g. 10 ms radio frame). Each frame comprises a pattern made of frequency (e.g. sub-carrier) and time (e.g. OFDM symbols). The 10 ms radio frame is divided into plurality of adjacent 0.5 ms sub-frames (also referred to as sub-frames or timeslots and interchangeably used hereinafter). Each sub-frame comprises plurality of resource blocks, wherein each resource block made up of one or more sub-carrier and one or more OFDM symbol. One or more resource blocks may be used for transmission of data, control information, pilot, or any combination thereof.

A single-frequency network or MBSFN is a broadcast network where several transmitters simultaneously send the same signal over the same frequency channel. Analog FM and AM radio broadcast networks as well as digital broadcast networks can operate in this manner. Analog television transmission has proven to be more difficult, since the MBSFN results in ghosting due to echoes of the same signal.

A simplified form of MBSFN can be achieved by a low power co-channel repeater, booster, or broadcast translator, which is utilized as gap filler transmitter. The aim of MBSFNs is efficient utilization of the radio spectrum, allowing a higher number of radio and TV programs in comparison to traditional multi-frequency network (MFN) transmission. An MBSFN may also increase the coverage area and decrease the outage probability in comparison to an MFN, since the total received signal strength may increase to positions midway between the transmitters.

MBSFN schemes are somewhat analogous to what in non-broadcast wireless communication, for example cellular networks and wireless computer networks, is called transmitter macrodiversity, CDMA soft handoff and Dynamic Single Frequency Networks (DSFN). MBSFN transmission can be considered as a special form of multipath propagation. In multipath propagation generally, the radio receiver receives several echoes of the same signal, and the constructive or destructive interference among these echoes (also known as self-interference) may result in fading. This is problematic especially in wideband communication and high-data rate digital communications, since the fading in that case is frequency-selective (as opposed to flat fading), and since the time spreading of the echoes may result in intersymbol interference (ISI). Fading and ISI can be avoided by means of diversity schemes and equalization filters. In an MBSFN transmission, means are provided for the receiver to align these echoes of the signal so that they function only as constructive interference, resulting in a higher signal-to-noise ratio (SNR).

In wideband digital broadcasting, self-interference cancellation is facilitated by the OFDM or COFDM modulation method. OFDM uses a large number of slow low-bandwidth modulators instead of one fast wide-band modulator. Each modulator has its own frequency sub-channel and sub-carrier frequency. Since each modulator is very slow, we can afford to insert a guard interval between the symbols, and thus eliminate the ISI. Although the fading is frequency-selective over the whole frequency channel, it can be considered as flat within the narrowband sub-channel. Thus, advanced equalization filters can be avoided. A forward error correction code (FEC) can counteract that a certain portion of the sub-carriers are exposed to too much fading to be correctly demodulated.

OFDM is utilized in the terrestrial digital TV broadcasting systems such as DVB-T and ISDB-T. OFDM is also widely used in digital radio systems, including DAB, HD Radio, and T-DMB. Therefore these systems are well suited to MBSFN operation. The 8VSB modulation method used in North America for digital TV, specified in ATSC standard A/110, may perhaps also allow the use of MBSFN transmission.

Through the use of virtual channel numbering, a multi-frequency network (MFN) can appear as an MBSFN to the viewer in ATSC. Alternatives to using OFDM modulation in MBSFN self-interference cancellation would be: CDMA Rake receivers. MIMO channels (i.e. phased array antenna), single-carrier modulation in combination by guard intervals and frequency domain equalization. In a Multicast/Broadcast Single Frequency Network, the transmitters and receivers are usually synchronized with the others, using GPS or a signal from the main station or network as a reference clock. For example, the use of a special marker can be employed, the Mega-frame Initialization Packet (MIP) that is inserted in the bit stream at a central distribution point, and signals to the MBSFN transmitters the absolute time (as read from a GPS receiver) at which this point in the data stream is to be broadcast.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. Access terminals 116 and 122 can be UEs. In a FDD system, communication links 118, 120, 124, and 126 may use different frequency for communication. For example, forward link 120 may use a different frequency than that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beam forming in order to improve the signal-to-noise ratio of forward links for the different access terminals 116 and 124. Also, an access point using beam forming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal, or some other terminology.

Figure 2:
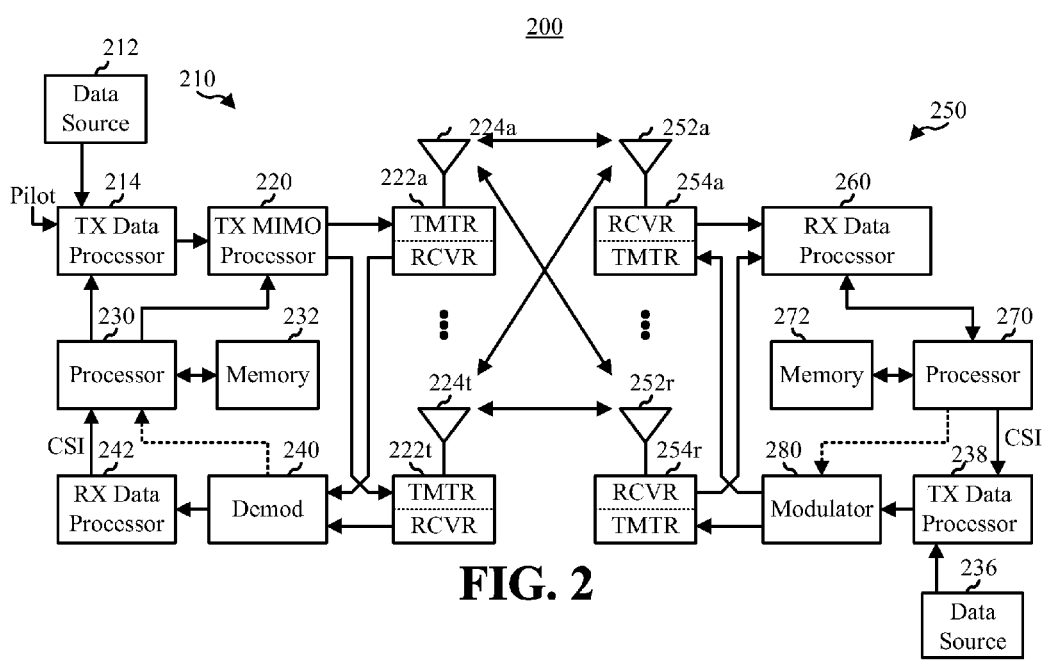
FIG. 2 depicts an example communications apparatus for employment with a wireless communications environment in accordance with one or more aspects.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using FORM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BASK, ASK, M-PSF, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beam-forming weights to the symbols of the data streams and to the antenna from which the symbol is being transmitted.

Each transmitter 222 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beam forming weights then processes the extracted message.

In an aspect, logical channels are classified into Control Channels and Traffic Channels. Logical Control Channels comprises Broadcast Control Channel (BCCH) that is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. Dedicated Control Channel (DCCH) is Point-to-point bi-directional channel that transmits dedicated control information and used by UEs having an RRC connection. In aspect, Logical Traffic Channels comprise a Dedicated Traffic Channel (DTCH) that is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH), and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low signal peak to average (PAR) values, and at any given time, the channel is contiguous or uniformly spaced in frequency that is a desired property of a single carrier waveform.

In Multicast/Broadcast Single Frequency Network (MBSFN) transmissions of multicast or broadcast services (e.g., MBMS), the coverage of service is limited by interference at the edge of the MBSFN transmission area. To minimize this problem, current designs call for a "buffer zone" of cells at the edge of the area that do not transmit in the radio resources assigned to the service. Some of the exemplary generalized non-limiting embodiments described herein include employing the radio resources of these "inactive" cells to reinforce the transmission.

The "dead zone" of inactive cells appears to be the state of the art; others have not noticeably addressed the possibility of using the apparently wasted radio capacity. Cells in the inactive area can be employed to transmit reinforcing copies of the transmission from the neighboring MBSFN area in stock. Where two MBSFN areas meet without a buffer zone, the radio resources of the boundary cells in each area are assigned to reinforce the transmission in the other area. In stock the herein described methods and apparatus can include a mapping of radio resources to support this.

Described herein is a method for reinforcing broadcast transmissions at the edge of a group of synchronized cells. The nominal setting is MBMS in the 3GPP LTE environment, but the general outlines of the method are the same for any MBSFN broadcast transmission in which the transmission data rate may be limited by interference from cells at the edge of the service area.

In the 3GPP LTE setting, MBMS is primarily intended to be realised as a set of synchronised transmissions in a Multicast/Broadcast Single Frequency Network (MBSFN). The principle in MBSFN operation is that all the cells in a geographic area transmit a bit-identical data stream using synchronized radio resources; thus, for a UE listening to the service in a particular cell, the transmissions from neighboring cells appear as reinforcing signal rather than as interference.

Figure 3:
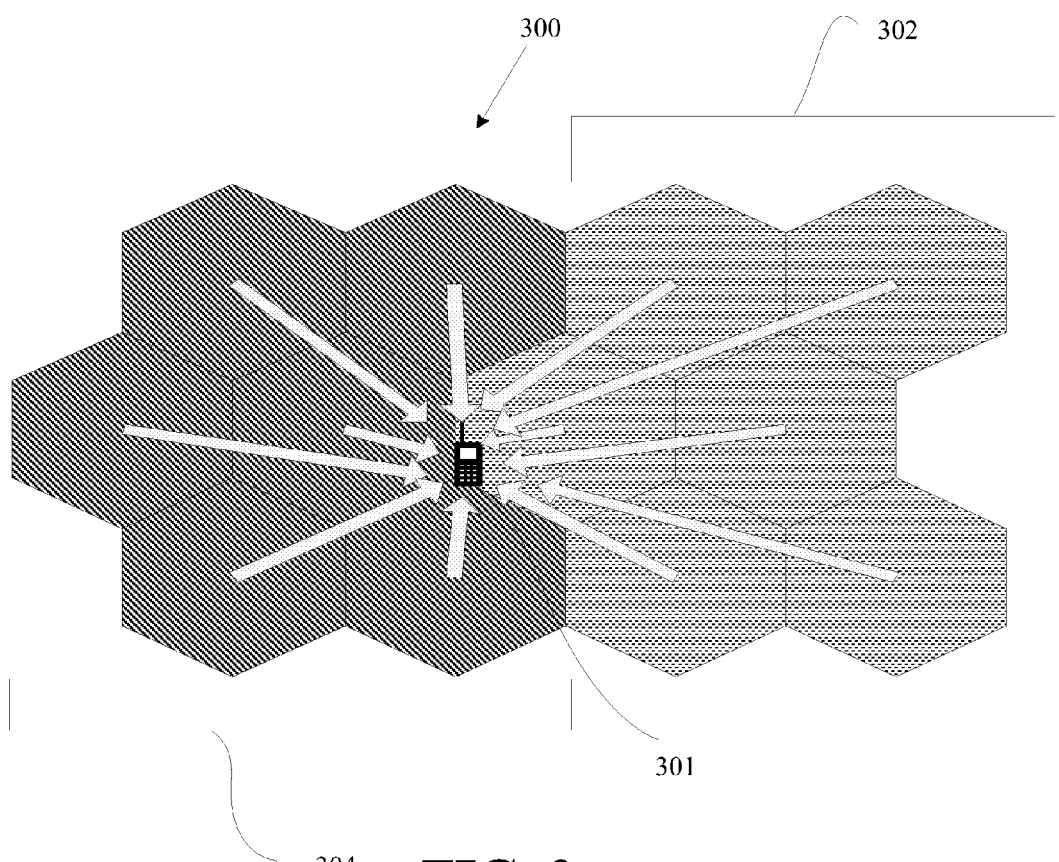
FIG. 3 illustrates a noisy environment.

However, the geographic "footprint" of a service is naturally limited (the evening news in Helsinki is probably not of much interest to subscribers in Beijing); in addition, the geographical area across which radio resources can be coordinated by a single network node may be limited. Where two different MBSFN service areas meet, the benefits of MBSFN transmission are largely lost for UEs near the boundary; within MBSFN area 1, the transmissions from MBSFN area 2 are seen as interference, and vice versa. This situation is illustrated in FIG. 3 in a noisy environment 300, with the shading representing different MBSFN areas; a UE 301 in the illustration is listening to a transmission from the lighter shaded cells 302, but seeing a large amount of interference because of its proximity to the darker shaded cells 304 in the other MBSFN transmission group.

Figure 4:
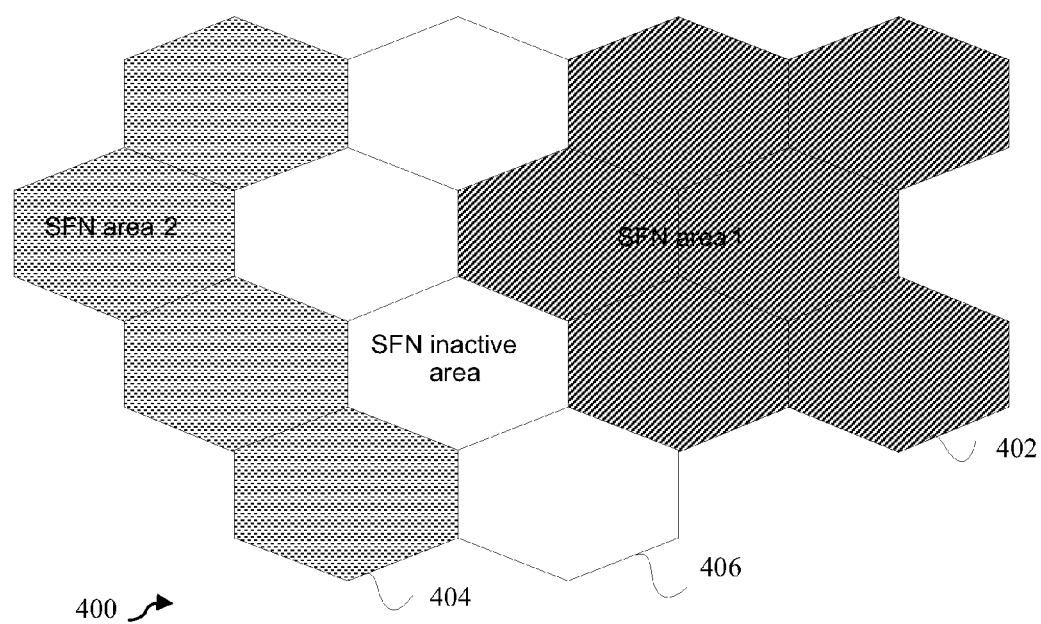
FIG. 4 shows an environment with a first MBSFN area (MBSFN area 1) separated from a second MBSFN area (MBSFN area 2) by an MBSFN inactive area.

To minimize this interference, it is contemplated in RAN3 to maintain a so-called "MBSFN inactive area" as a buffer zone. Cells within this zone would be forbidden to use the radio resources reserved for the MBSFN transmission; the capacity of these radio resources would go to waste in the inactive cells, but they would not create interference for cells within the MBSFN area itself. FIG. 4 shows this environment 400 with a first MBSFN area 402 (MBSFN area 1) separated from a second MBSFN area 404 (MBSFN area 2) by a MBSFN inactive area 406.

Here the two MBSFN areas can use the same radio resources without causing large amounts of interference, because the "silent" cells in the inactive area separate them. The disadvantage is evident; UEs in the inactive area probably cannot receive either service reliably.

In an aspect, described herein are methods of reusing the idled radio resources in the MBSFN inactive area to contribute to the adjacent MBSFN transmissions.

Figure 5:
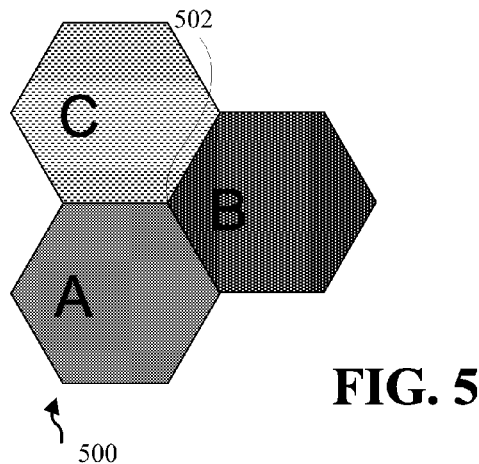
FIG. 5 shows an environment including a medium shaded cell A, a dark shaded cell B, and a light shaded cell C meeting at a triple point in accordance with one or more aspects.

Consider the case where three MBSFN areas meet at a point 502, as represented by the differently shaded cells 500 in FIG. 5 including a medium shaded cell A, a dark shaded cell B, and a light shaded cell C. For a UE near the triple point 502, served by cell A in the medium shaded MBSFN area, the expected SNR would be −3 dB (signal from cell A, and interference from B and C, all at approximately equal strengths).

Figure 6:
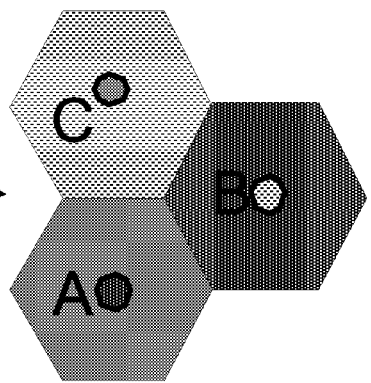
FIG. 6 shows an environment to carry additional transmissions in each of the cells where the central dots indicate a duplicate transmission of an adjacent MBSFN area's data in accordance with one or more aspects.

In an aspect, to mitigate the interference, described is a method to carry additional transmissions in each of the cells, as shown in FIG. 6. The central dots indicate a duplicate transmission of an adjacent MBSFN area's data. That is, cell C transmits the service belonging to itself and also a copy of the service from the cell B. Cell B transmits the service belonging to itself and also a copy of the service from the cell C. Cell A transmits the service belonging to itself and also a copy of the service from the cell B. For example, cell A can be broadcasting Los Angeles local news, cell B can be transmitting San Diego local news, and both cells A and B (because they are guard or border or buffer cells) transmit each other's transmissions and/or cell C's signal.

Figure 7:
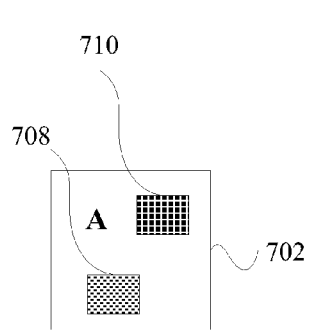
FIG. 7 illustrates an environment of scheduling for the cells in accordance with one or more aspects.
Figure 7:
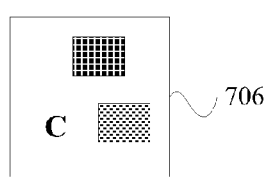

This means that the services need to be scheduled in separate resource blocks. An example of scheduling for the cells above is shown in FIG. 7 at environment 700. Cell A's transmission is illustrated at 702. Cell B's transmission is illustrated at 704. Cell C's transmission is illustrated at 706. The "extra" transmissions are shaded lighter in each cell at 708, while the regular transmissions are at 710. These resource blocks would not normally be read by any UE in the cell that transmits them; they are provided only to reinforce transmissions for UEs in other cells.

Now, consider a UE at the triple point 502 of FIG. 5, served by cell A. It sees a reinforcing signal from cell C as well as the transmission from cell A; interference comes only from cell B. In a perfect RF environment, with no other contributions, the SNR would be 3 dB, a gain of 6 dB over the situation without the reinforcing transmissions.

This 6 dB gain could be used, e.g., to permit the system to apply changes to modulation and coding to produce a higher application data rate. The exact gain depends upon modulation assumptions and the required coverage levels; however, analysis suggests that the limiting (edge of cell) data rate could be increased by as much as a factor of three, far more than necessary to compensate for the extra radio resources used by the reinforcing transmissions.

Figure 8:
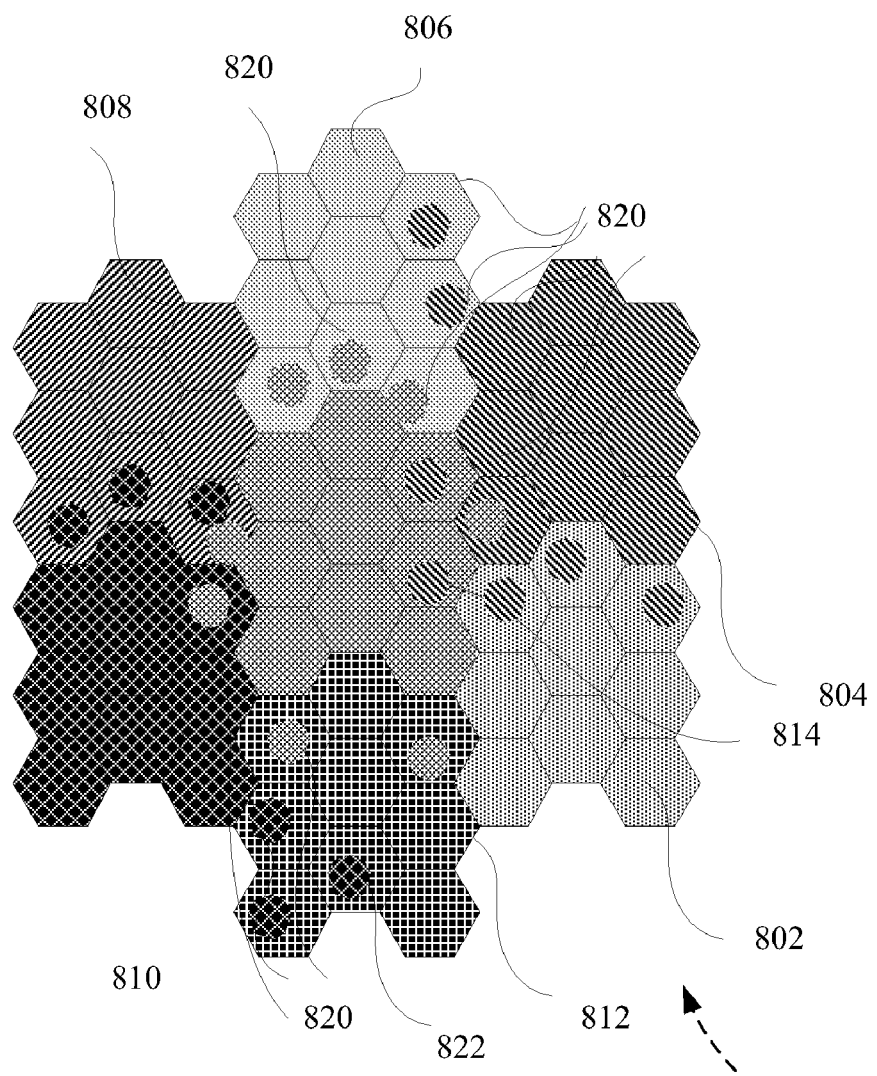
FIG. 8 illustrates an environment with a first MBSFN, a second MBSFN, a third MBSFN, a fourth MBSFN, a fifth MBSFN, and a sixth MBSFN, wherein each MBSFN area having 9 cells in accordance with one or more aspects.

It should be noted that in reasonably well-behaved geometries, with MBSFN areas meeting either at an edge or a triple point, the reinforcing scheme can be extended indefinitely. FIG. 8 illustrates an environment 800 with a first MBSFN 802 a second MBSFN 804, a third MBSFN 806, a fourth MBSFN 808, a fifth MBSFN 810, and a sixth MBSFN 812 each MBSFN area having 9 cells. The figure indicates one possible arrangement for the reinforcing transmissions in boundary cells; it should be clear that the pattern shown can be repeated. At 820 the cells are transmitting service of adjoining MBSFNs. It can be one adjoining MBSFN or two or more MBSFNs. At 822 a cell is illustrated that is one in from the boundary, and thus it is contemplated that a cell broadcasting its' own service and echoing another MBSFN cell's service is not limited to only boundary cells. This is especially useful in a Femto-cell environment as set forth below.

More complex interactions between MBSFN areas (e.g., if a "four corners" situation is unavoidable) may require changes to this tiling scheme to adapt to the more complex environment. In most cases, these challenges could be met by ad-hoc arrangements, but there may be geometries in which some coverage at the edge of the MBSFN area has to be sacrificed. Therefore, in some embodiments, the border includes some cells echoing another MBSFN's transmission and some cells that do not echo another MBSFN's transmission. In any case the limiting SNR is always higher than it would be without the reinforcing transmissions.

While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, which may be digital, analog, or both digital and analog, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

Figure 9:
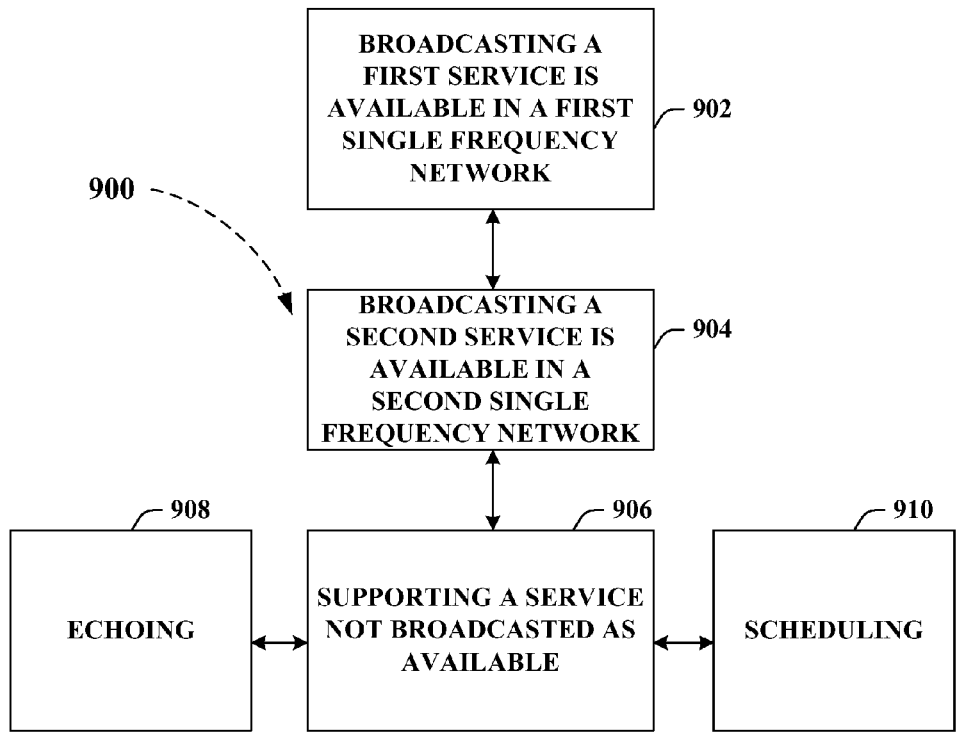
FIG. 9 illustrates a methodology including broadcasting a first service is available in a first MBSFN in accordance with one or more aspects.

FIG. 9 illustrates a methodology 900 including broadcasting a first service is available in a first MBSFN at 902. At 904 is broadcasting a second service is available in a second MBSFN. At 906 is supporting a service not broadcasted as available. At 908 this supporting or reinforcing 906 is done by echoing at 908. At 910 is the scheduling. For example, MBSFN 1 including cell A can be broadcasting both the Los Angeles local news and that the Los Angeles local news is available, MBSFN 2 including cell B can be transmitting San Diego local news and that the San Diego local news is available. Cell A does not advertise that San Diego local news service is available, and Cell B does not advertise that the Los Angeles local news service is available, but both cells A and B (because they are guard or border or buffer cells) transmit each other's transmissions as reinforcing signals for the benefit of receivers in the other cell.

When the embodiments are implemented in software, firmware, middleware, or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 10:
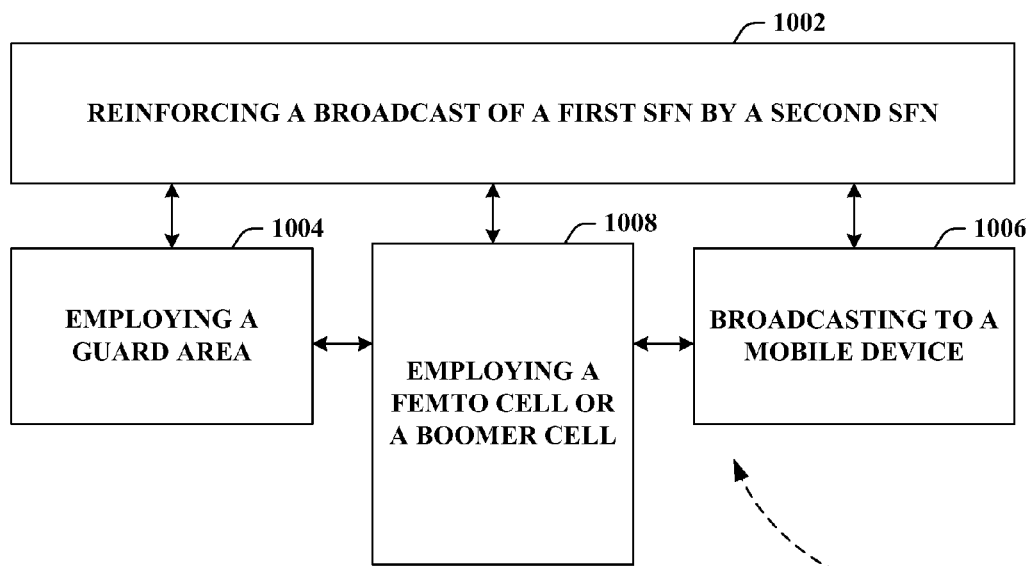
FIG. 10 illustrates a methodology including reinforcing a broadcast of a first MBSFN by a second MBSFN at in accordance with one or more aspects.

FIG. 10 illustrates a methodology 1000 including reinforcing a broadcast of a first MBSFN by a second MBSFN at 1002. In one exemplary generalized non-limiting embodiment, the methodology 1000 includes employing a guard area to reinforce the broadcast of the first MBSFN by the second MBSFN at 1004. In another exemplary generalized non-limiting embodiment, the methodology 1000 includes broadcasting to a mobile device at 1006. The mobile device can be receiving a signal from a femtocell or a boomer cell. A femtocell was originally called an Access Point Base Station— and is a scalable, multi-channel, two-way communication device extending a typical base station by incorporating all of the major components of the telecommunications infrastructure. A typical example is a UMTS access point base station containing a Node-B, RNC, and GSN, with only an Ethernet or broadband connection (less commonly, ATM/TDM) to the Internet or an intranet. Application of VoIP allows such a unit to provide voice and data services in the same way as a normal base station, but with the deployment simplicity of a Wi-Fi access point. Other examples include CDMA-2000 and WiMAX solutions.

The main benefit of an Access Point Base Station is the simplicity of ultra low cost, scalable deployment. Design studies have shown that access point base stations can be designed to scale from simple hot-spot coverage through to large deployments by racking such units into full-scale basestations. The claimed attractions for a cellular operator are that these devices can increase both capacity and coverage while reducing both capex (Capital expenditures) and opex (Operating expenditures).

Access Point Base Stations are stand-alone units that are typically deployed in hot-spots, in-building and even in-home. Variations include attaching a Wi-Fi router to allow a Wi-Fi hot-spot to work as backhaul for a cellular hotspot, or vice versa. Femtocells are an alternative way to deliver the benefits of Fixed Mobile Convergence. The distinction is that most FMC architectures require a new (dual-mode) handset, while a femtocell-based deployment will work with existing handsets.

As a result, Access Point Base Stations must work with handsets that are compliant with existing RAN technologies. The reuse of existing RAN technologies (and potentially re-use of existing frequency channels) could create problems, since the additional femtocell transmitters represent a large number of interference sources, potentially resulting in significant operational challenges for existing deployments. This is one of the biggest areas that femtocells must overcome if they are to be successful.

Access Point Base Stations typically rely on the Internet for connectivity, which can potentially reduce deployment costs but introduces security risks that generally do not exist in typical cellular systems. A boomer cell is a very big cell that would cover state sized area or larger.

Figure 11:
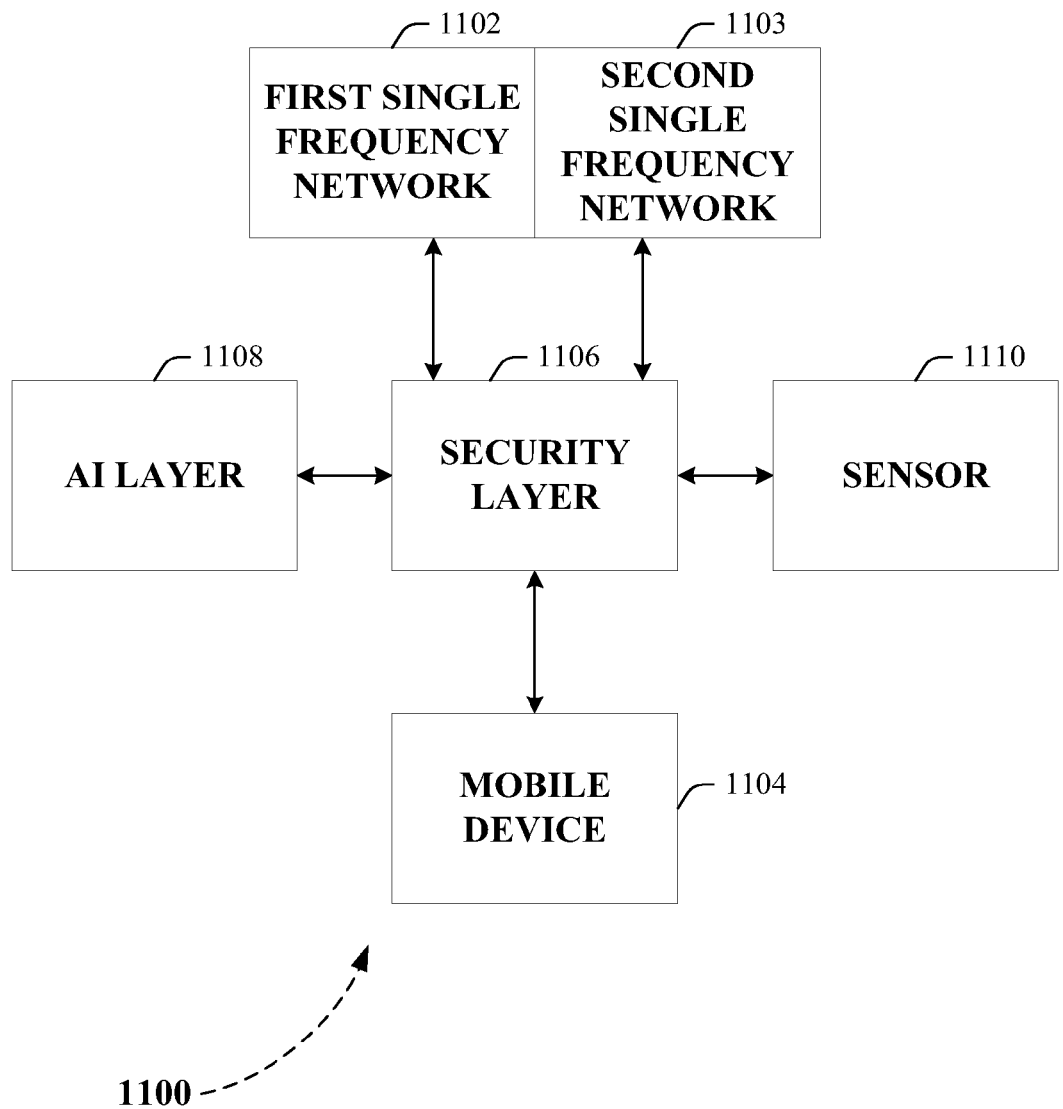
FIG. 11 illustrates a methodology wherein a first MBSFN is broadcasting and a second MBSFN is broadcasting in accordance with one or more aspects.

FIG. 11 illustrates a methodology 1100 wherein a first MBSFN is broadcasting at 1102 and a second MBSFN is broadcasting at 1003. The first MBSFN is broadcasting a service such as a CNN feed or a MSNBC feed to a mobile device at 1104. The mobile device is in motion and is approaching an area where support from the second MBSFN would be helpful. In one exemplary generalized non-limiting embodiment, the methodology 1000 includes employing a security layer at 1006. The security layer can determine if the user is authorized to receive the feed or not and can instruct the second MBSFN to provide the service to the mobile device when the service is authorized. The decision can be made through the employ of an AI layer. In addition, in other embodiments with or without the security layer, cells can dynamically reinforce or not reinforce based at least partially on an AI decision. A sensor can provide feedback at to assist in that decision. For example, the sensor can determine network conditions at a specific time and alter the number and/or locations of reinforcing cells.

Because at least a portion of the communication between the device 1104 and the MBSFNs are wireless, the security layer 1106 is provided in one exemplary generalized non-limiting embodiment. The security layer 1106 can be used to cryptographically protect (e.g., encrypt) data as well as to digitally sign data, to enhance security and unwanted, unintentional, or malicious disclosure. In operation, the security component or layer 1106 can communicate data to/from both the MBSFNs and the mobile device 1104.

An encryption component can be used to cryptographically protect data during transmission as well as while stored. The encryption component employs an encryption algorithm to encode data for security purposes. The algorithm is essentially a formula that is used to turn data into a secret code. Each algorithm uses a string of bits known as a 'key' to perform the calculations. The larger the key (e.g., the more bits in the key), the greater the number of potential patterns can be created, thus making it harder to break the code and descramble the contents of the data.

Most encryption algorithms use the block cipher method, which code fixed blocks of input that are typically from 64 to 128 bits in length. A decryption component can be used to convert encrypted data back to its original form. In one aspect, a public key can be used to encrypt data upon transmission to a storage device. Upon retrieval, the data can be decrypted using a private key that corresponds to the public key used to encrypt.

A signature component can be used to digitally sign data and documents when transmitting and/or retrieving from the device 1104. It is to be understood that a digital signature or certificate guarantees that a file has not been altered, similar to if it were carried in an electronically sealed envelope. The 'signature' is an encrypted digest (e.g., one-way hash function) used to confirm authenticity of data. Upon accessing the data, the recipient can decrypt the digest and also re-compute the digest from the received file or data. If the digests match, the file is proven to be intact and tamper free. In operation, digital certificates issued by a certification authority are most often used to ensure authenticity of a digital signature.

Still further, the security layer 1106 can employ contextual awareness (e.g., context awareness component) to enhance security. For example, the contextual awareness component can be employed to monitor and detect criteria associated with data transmitted to and requested from the device 1104. In operation, these contextual factors can be used to filter spam, control retrieval (e.g., access to highly sensitive data from a public network), or the like. It will be understood that, in aspects, the contextual awareness component can employ logic that regulates transmission and/or retrieval of data in accordance with external criteria and factors. The contextual awareness employment can be used in connection with an artificial intelligence (AI) layer 1108.

The AI layer or component can be employed to facilitate inferring and/or determining when, where, how to dynamically vary the level of security and/or the amount of echoing. Such inference results in the construction of new events or actions from a set of observed events and/or stored event data, whether or not the events are correlated in close temporal proximity, and whether the events and data come from one or several event(s) and data source(s).

The AI component can also employ any of a variety of suitable AI-based schemes in connection with facilitating various aspects of the herein described innovation. Classification can employ a probabilistic and/or statistical-based analysis (e.g., factoring into the analysis utilities and costs) to prognose or infer an action that a user desires to be automatically performed. The AI layer can be used in conjunction with the security layer to infer changes in the data being transferred and make recommendations to the security layer as to what level of security to apply.

For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

Additionally the sensor 1110 can be employed in conjunction with the security layer 1106. Still further, human authentication factors can be used to enhance security employing sensor 1110. For instance, biometrics (e.g., fingerprints, retinal patterns, facial recognition, DNA sequences, handwriting analysis, voice recognition) can be employed to enhance authentication to control access of the storage vault. It will be understood that embodiments can employ multiple factor tests in authenticating identity of a user.

The sensor 1110 can also be used to provide the security layer 1106 with generalized non-human metric data, such as electromagnetic field condition data or predicted weather data etc. For example, any conceivable condition can be sensed for and security levels can be adjusted or determined in response to the sensed condition.

Figure 12:
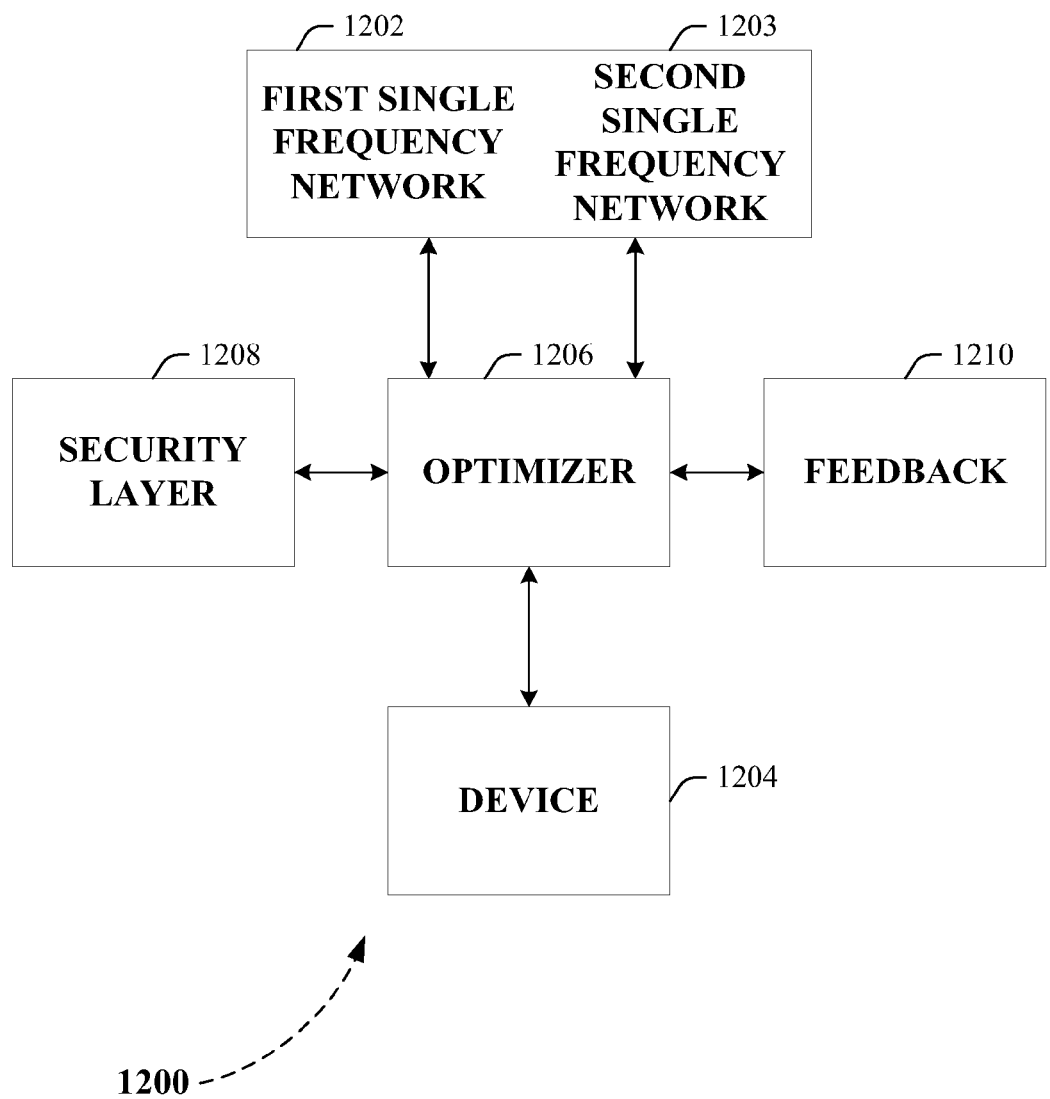
FIG. 12 illustrates an environment wherein a first MBSFN is broadcasting and a second MBSFN is broadcasting in accordance with one or more aspects.

FIG. 12 illustrates an environment 1200 wherein a first MBSFN is broadcasting at 1202 and a second MBSFN is broadcasting at 1203. The first MBSFN is broadcasting a service such as a CNN feed or a MSBN feed to a mobile device at 1204. The mobile device is in motion and is approaching an area where support from the second MBSFN would be helpful. In one exemplary generalized non-limiting embodiment, the methodology 1200 includes employing an optimizer at 1206. The optimizer 1206 is provided to optimize communication between the MBSFNs and device 1204. Optimizer 1206 optimizes or increases communication between the MBSFNs and device 1204 by receiving security information from a security layer 1208. For example, when security layer 1208 informs optimizer 1206 that they are both in a secured environment, the optimizer 1206 balances this information with other information and may instruct the security layer 1208 to make all transmissions security free to achieve top speed. Additionally, a feedback layer or component 1210 can provide feedback as to missed data packets or other information to provide feedback to the optimizer 1206. This feedback of missed packets can be balanced against desired security level to enable less secure but higher throughput data transfer if desired.

Figure 13:
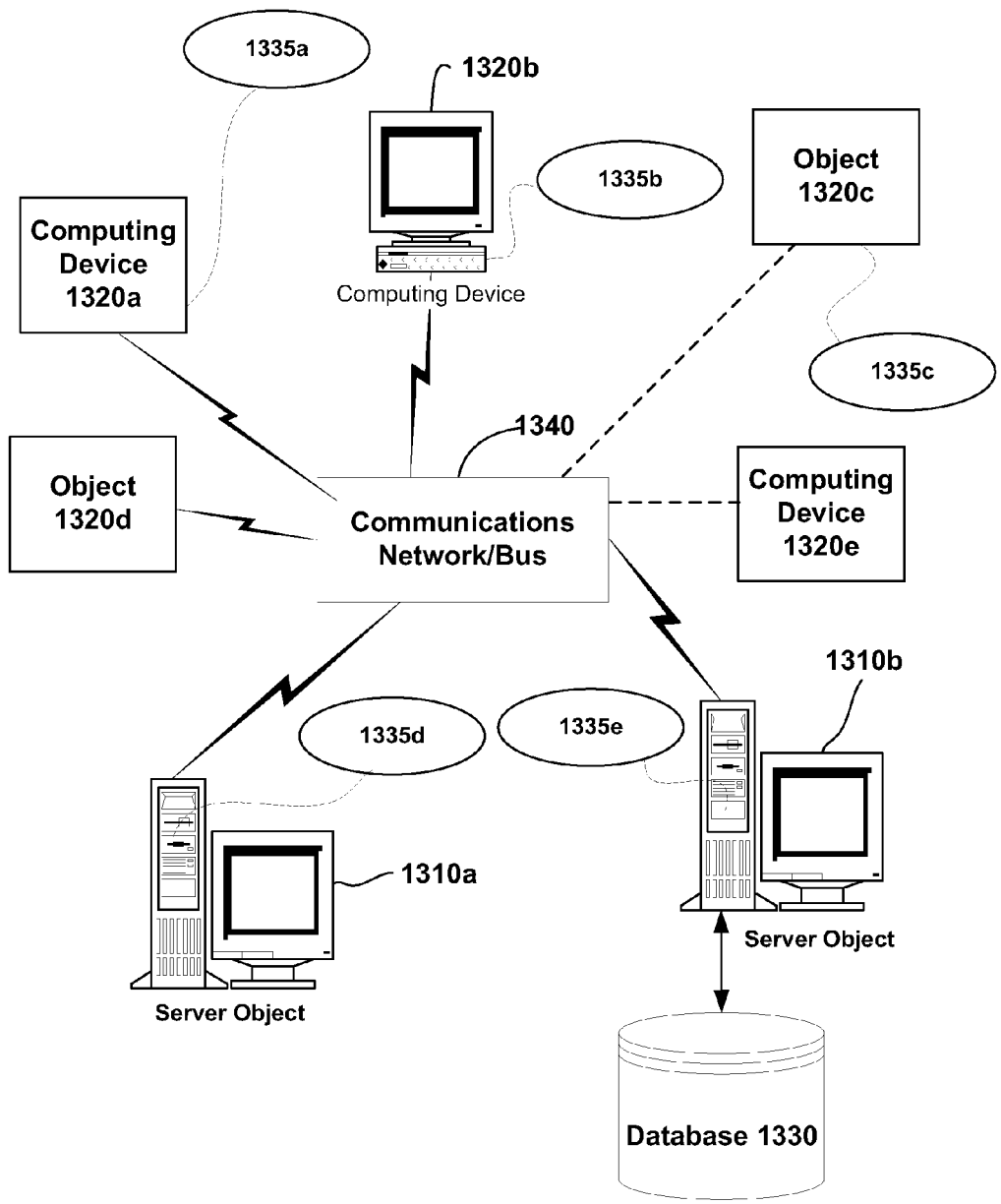
FIG. 13 illustrates an exemplary networked or distributed environment, with server(s) in communication with client computer (s) via a network/bus, in which the present innovation can be employed in accordance with one or more aspects.

FIG. 13 provides a schematic diagram of an exemplary networked or distributed computing environment in which echoing can be employed. The distributed computing environment comprises computing objects 1310a, 1310b, etc. and computing objects or devices 1320a, 1320b, 1320c, 1320d, 1320e, etc. These objects can comprise programs, methods, data stores, programmable logic, etc. The objects can comprise portions of the same or different devices such as PDAs, audio/video devices, MP3 players, personal computers, etc. Each object can communicate with another object by way of the communications network 1340. This network can itself comprise other computing objects and computing devices that provide services to the system of FIG. 13, and can itself represent multiple interconnected networks. In accordance with an aspect of at least one generalized non-limiting embodiment, each object 1310a, 1310b, etc. or 1320a, 1320b, 1320c, 1320d, 1320e, etc. can contain an application that might make use of an application programming interface (API), or other object, software, firmware and/or hardware, suitable for use with the design framework in accordance with at least one generalized non-limiting embodiment.

It can also be appreciated that an object, such as 1320c, can be hosted on another computing device 1310a, 1310b, etc. or 1320a, 1320b, 1320c, 1320d, 1320e, etc. Thus, although the physical environment depicted can show the connected devices as computers, such illustration is merely exemplary and the physical environment can alternatively be depicted or described comprising various digital devices such as PDAs, televisions, MP3 players, etc., any of which can employ a variety of wired and wireless services, software objects such as interfaces, COM objects, and the like.

There are a variety of systems, components, and network configurations that support distributed computing environments. For example, computing systems can be connected together by wired or wireless systems, by local networks or widely distributed networks. Currently, many of the networks are coupled to the Internet, which provides an infrastructure for widely distributed computing and encompasses many different networks. Any of the infrastructures can be used for exemplary communications made incident to optimization algorithms and processes according to the present innovation.

In home networking environments, there are at least four disparate network transport media that can each support a unique protocol, such as Power line, data (both wireless and wired), voice (e.g., telephone) and entertainment media. Most home control devices such as light switches and appliances can use power lines for connectivity. Data Services can enter the home as broadband (e.g., either DSL or Cable modem) and are accessible within the home using either wireless (e.g., HomeRF or 802.11A/B/G) or wired (e.g., Home PNA, Cat 5, Ethernet, even power line) connectivity. Voice traffic can enter the home either as wired (e.g., Cat 3) or wireless (e.g., cell phones) and can be distributed within the home using Cat 3 wiring. Entertainment media, or other graphical data, can enter the home either through satellite or cable and is typically distributed in the home using coaxial cable. IEEE 1394 and DVI are also digital interconnects for clusters of media devices. All of these network environments and others that can emerge, or already have emerged, as protocol standards can be interconnected to form a network, such as an intranet, that can be connected to the outside world by way of a wide area network, such as the Internet. In short, a variety of disparate sources exist for the storage and transmission of data, and consequently, any of the computing devices of the present innovation can share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 13, as an example, computers 1320a, 1320b, 1320c, 1320d, 1320e, etc. can be thought of as clients and computers 1310a, 1310b, etc. can be thought of as servers where servers 1310a, 1310b, etc. maintain the data that is then replicated to client computers 1320a, 1320b, 1320c, 1320d, 1320e, etc., although any computer can be considered a client, a server, or both, depending on the circumstances. Any of these computing devices can be processing data or requesting services or tasks that can implicate the optimization algorithms and processes in accordance with at least one generalized non-limiting embodiment.

A server is typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the optimization algorithms and processes of at least one generalized non-limiting embodiment can be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) can be coupled to one another via TCP/IP connection(s) for high-capacity communication.

Thus, FIG. 13 illustrates an exemplary networked or distributed environment, with server(s) in communication with client computer (s) via a network/bus, in which the herein described echoing or supporting one MBSFN with another MBSFN can be employed. In more detail, a number of servers 1310a, 1310b, etc. are interconnected via a communications network/bus 1340, which can be a LAN, WAN, intranet, GSM network, the Internet, etc., with a number of client or remote computing devices 1320*a*, 1320*b*, 1320*c*, 1320*d*, 1320*e*, etc., such as a portable computer, handheld computer, thin client, networked appliance, or other device, such as a VCR, TV, oven, light, heater and the like in accordance with the present innovation. It is thus contemplated that the present innovation can apply to any computing device in connection with which it is desirable to communicate data over a network.

In a network environment in which the communications network/bus 1340 is the Internet, for example, the servers 1310*a*, 1310*b*, etc. can be Web servers with which the clients 1320*a*, 1320*b*, 1320*c*, 1320*d*, 1320*e*, etc. communicate via any of a number of known protocols such as HTTP. Servers 1310*a*, 1310*b*, etc. can also serve as clients 1320*a*, 1320*b*, 1320*c*, 1320*d*, 1320*e*, etc., as can be characteristic of a distributed computing environment.

As mentioned, communications can be wired or wireless, or a combination, where appropriate. Client devices 1320*a*, 1320*b*, 1320*c*, 1320*d*, 1320*e*, etc. can or cannot communicate via communications network/bus 14, and can have independent communications associated therewith. For example, in the case of a TV or VCR, there can or cannot be a networked aspect to the control thereof. Each client computer 1320*a*, 1320*b*, 1320*c*, 1320*d*, 1320*e*, etc. and server computer 1310*a*, 1310*b*, etc. can be equipped with various application program modules or objects 1335*a*, 1335*b*, 1335*c*, etc. and with connections or access to various types of storage elements or objects, across which files or data streams can be stored or to which portion(s) of files or data streams can be downloaded, transmitted or migrated. Any one or more of computers 1310*a*, 1310*b*, 1320*a*, 1320*b*, 1320*c*, 1320*d*, 1320*e*, etc. can be responsible for the maintenance and updating of a database 1330 or other storage element, such as a database or memory 1330 for storing data processed or saved according to at least one generalized non-limiting embodiment. Thus, the present innovation can be utilized in a computer network environment having client computers 1320*a*, 1320*b*, 1320*c*, 1320*d*, 1320*e*, etc. that can access and interact with a computer network/bus 1340 and server computers 1310*a*, 1310*b*, etc. that can interact with client computers 1320*a*, 1320*b*, 1320*c*, 1320*d*, 1320*e*, etc. and other like devices, and databases 1330.

EXEMPLARY COMPUTING DEVICE

As mentioned, the innovation applies to any device wherein it can be desirable to communicate data, e.g., to a mobile device. It should be understood, therefore, that handheld, portable and other computing devices and computing objects of all kinds are contemplated for use in connection with the present innovation, i.e., anywhere that a device can communicate data or otherwise receive, process or store data. Accordingly, the below general purpose remote computer described below in FIG. 11 is but one example, and the present innovation can be implemented with any client having network/bus interoperability and interaction. Thus, the present innovation can be implemented in an environment of networked hosted services in which very little or minimal client resources are implicated, e.g., a networked environment in which the client device serves merely as an interface to the network/bus, such as an object placed in an appliance.

Although not required, at least one generalized non-limiting embodiment can partly be implemented via an operating system, for use by a developer of services for a device or object, and/or included within application software that operates in connection with the component(s) of at least one generalized non-limiting embodiment. Software can be described in the general context of computer executable instructions, such as program modules, being executed by one or more computers, such as client workstations, servers, or other devices. Those skilled in the art will appreciate that the innovation can be practiced with other computer system configurations and protocols.

Figure 14:
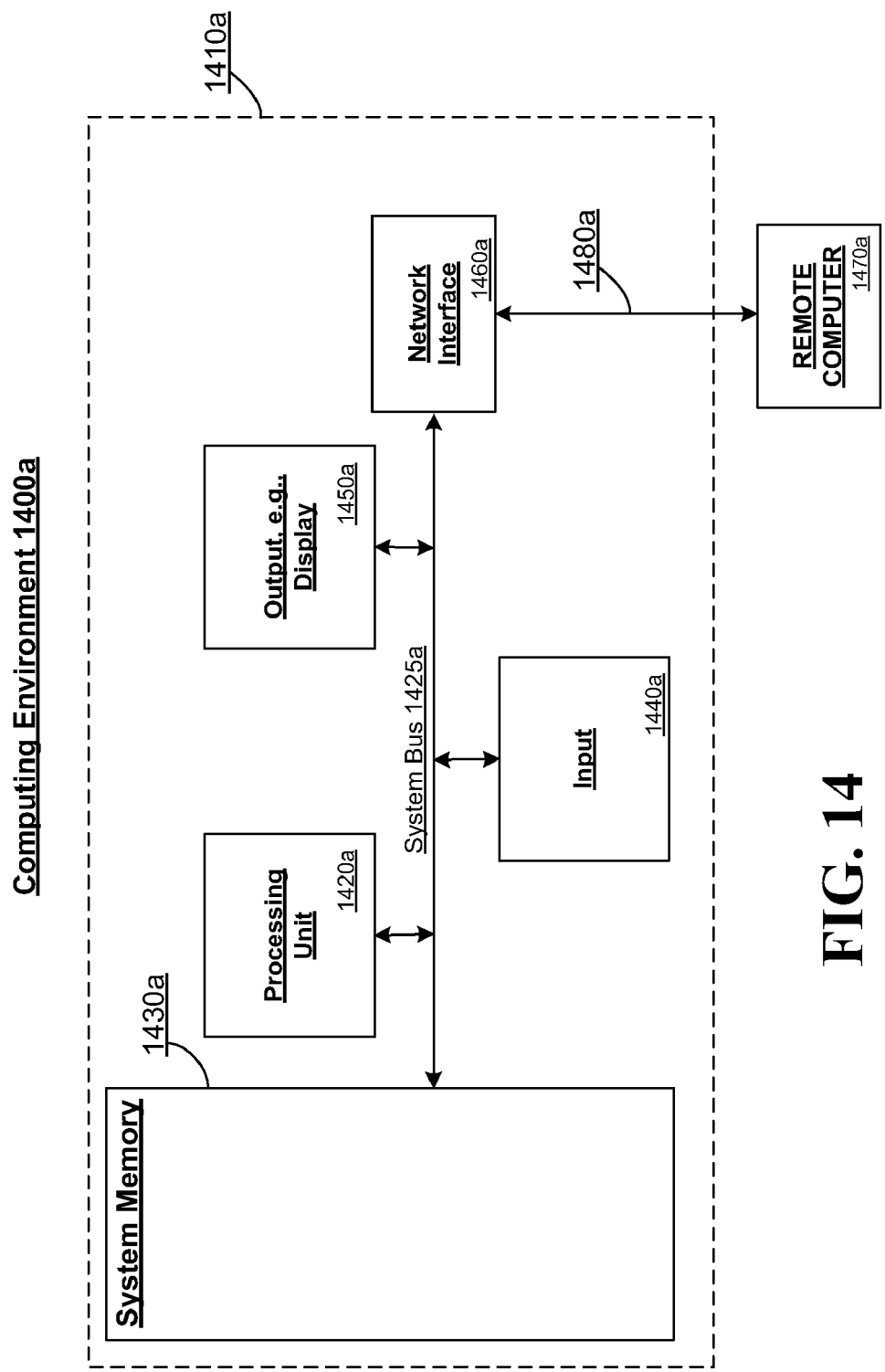
FIG. 14, an exemplary remote device for implementing at least one generalized non-limiting embodiment includes a general purpose computing device in the form of a computer in accordance with one or more aspects.

FIG. 14 thus illustrates an example of a suitable computing system environment 1400*a* in which the innovation can be implemented, although as made clear above, the computing system environment 1400*a* is only one example of a suitable computing environment and is not intended to suggest any limitation as to the scope of use or functionality of the innovation. Neither should the computing environment 1400*a* be interpreted as having any dependency or requirement relating to any one or combination of components illustrated in the exemplary operating environment 1400*a*.

With reference to FIG. 14, an exemplary remote device for implementing at least one generalized non-limiting embodiment includes a general purpose computing device in the form of a computer 1410*a*. Components of computer 1410*a* can include, but are not limited to, a processing unit 1420*a*, a system memory 1430*a*, and a system bus 1425*a* that couples various system components including the system memory to the processing unit 1420*a*. The system bus 1425*a* can be any of several types of bus structures including a memory bus or memory controller, a peripheral bus, and a local bus using any of a variety of bus architectures.

Computer 1410*a* typically includes a variety of computer readable media. Computer readable media can be any available media that can be accessed by computer 1410*a*. By way of example, and not limitation, computer readable media can comprise computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1410*a*. Communication media typically embodies computer readable instructions, data structures, program modules, or other data in a modulated data signal such as a carrier wave or other transport mechanism and includes any information delivery media.

The system memory 1430*a* can include computer storage media in the form of volatile and/or non-volatile memory such as read only memory (ROM) and/or random access memory (RAM). A basic input/output system (BIOS), containing the basic routines that help to transfer information between elements within computer 1410*a*, such as during start-up, can be stored in memory 1430*a*. Memory 1430*a* typically also contains data and/or program modules that are immediately accessible to and/or presently being operated on by processing unit 1420*a*. By way of example, and not limitation, memory 1430*a* can also include an operating system, application programs, other program modules, and program data.

The computer 1410*a* can also include other removable/non-removable, volatile/non-volatile computer storage media. For example, computer 1410*a* could include a hard disk drive that reads from or writes to non-removable, non-volatile magnetic media, a magnetic disk drive that reads from or writes to a removable, non-volatile magnetic disk, and/or an optical disk drive that reads from or writes to a removable, non-volatile optical disk, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1425a through a non-removable memory interface such as an interface, and a magnetic disk drive or optical disk drive is typically connected to the system bus 1425a by a removable memory interface, such as an interface.

A user can enter commands and information into the computer 1410a through input devices such as a keyboard and pointing device, commonly referred to as a mouse, trackball or touch pad. Other input devices can include a microphone, joystick, game pad, satellite dish, scanner, or the like. These and other input devices are often connected to the processing unit 1420a through user input 1440a and associated interface(s) that are coupled to the system bus 1425a, but can be connected by other interface and bus structures, such as a parallel port, game port or a universal serial bus (USB). A graphics subsystem can also be connected to the system bus 1425a. A monitor or other type of display device is also connected to the system bus 1425a via an interface, such as output interface 1450a, which can in turn communicate with video memory. In addition to a monitor, computers can also include other peripheral output devices such as speakers and a printer, which can be connected through output interface 1450a.

The computer 1410a can operate in a networked or distributed environment using logical connections to one or more other remote computers, such as remote computer 1470a, which can in turn have media capabilities different from device 1410a. The remote computer 1470a can be a personal computer, a server, a router, a network PC, a peer device or other common network node, or any other remote media consumption or transmission device, and can include any or all of the elements described above relative to the computer 1410a. The logical connections depicted in FIG. 14 include a network 1480a, such local area network (LAN) or a wide area network (WAN), but can also include other networks/buses. Such networking environments are commonplace in homes, offices, enterprise-wide computer networks, intranets, and the Internet.

When used in a LAN networking environment, the computer 1410a is connected to the LAN 1480a through a network interface or adapter. When used in a WAN networking environment, the computer 1410a typically includes a communications component, such as a modem, or other means for establishing communications over the WAN, such as the Internet. A communications component, such as a modem, which can be internal or external, can be connected to the system bus 1425a via the user input interface of input 1440a, or other appropriate mechanism. In a networked environment, program modules depicted relative to the computer 1410a, or portions thereof, can be stored in a remote memory storage device. It will be appreciated that the network connections shown and described are exemplary and other means of establishing a communications link between the computers can be used.

Figure 15:
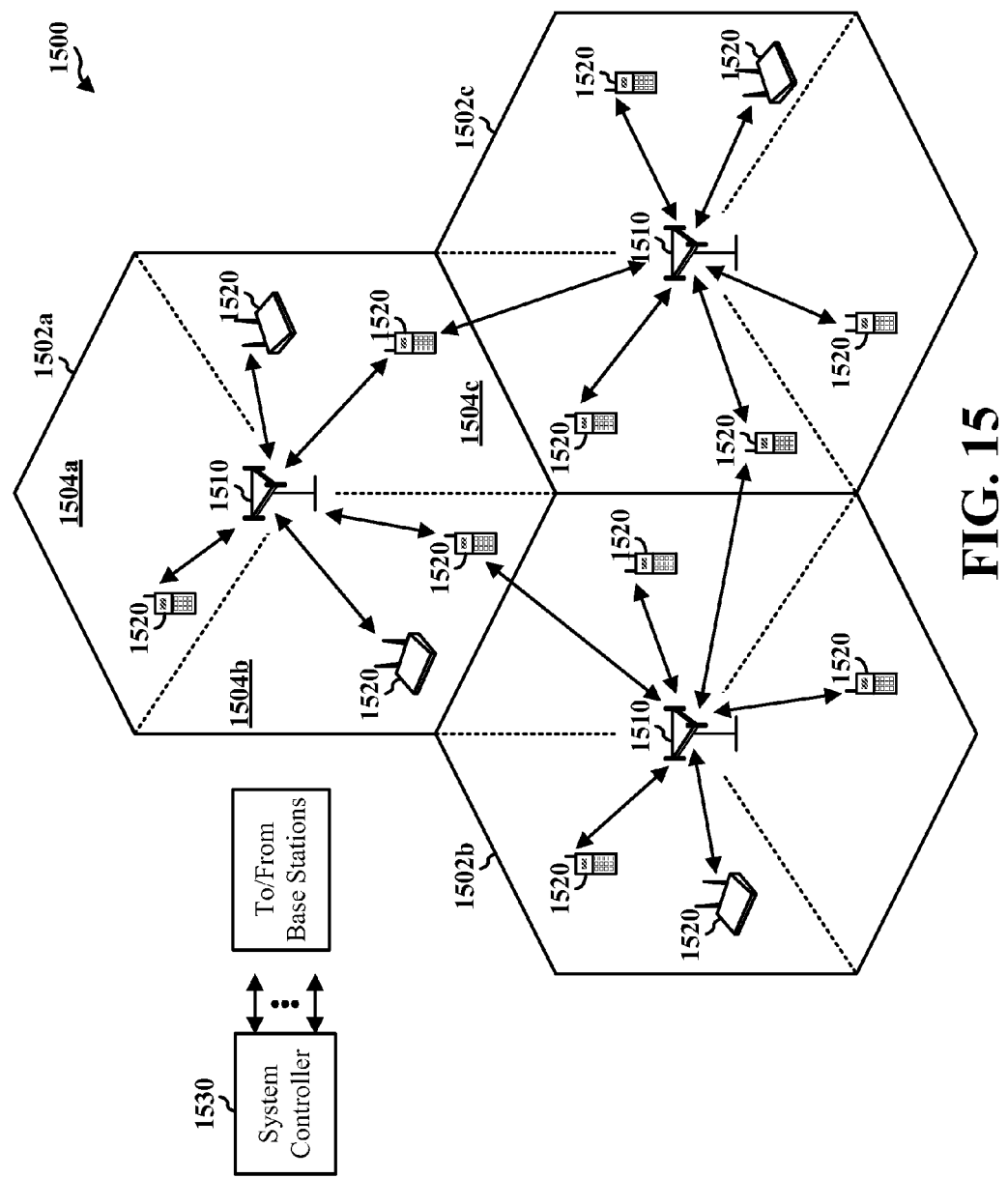
FIG. 15 illustrates a wireless communication system with multiple base stations and multiple terminals such as may be utilized in conjunction with one or more aspects.

FIG. 15 illustrates a wireless communication system 1500 with multiple base stations 1510 and multiple terminals 1520, such as may be utilized in conjunction with one or more aspects of the herein described echoing. A base station is generally a fixed station that communicates with the terminals and may also be called an access point, a Node B, or some other terminology. Each base station 1510 provides communication coverage for a particular geographic area, illustrated as three geographic areas, labeled 1502a, 1502b, and 1502c. The term "cell" can refer to a base station and/or its coverage area depending on the context in which the term is used. To improve system capacity, a base station coverage area may be partitioned into multiple smaller areas (e.g., three smaller areas, according to cell 1502a in FIG. 15), 1504a, 1504b, and 1504c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 1520 are typically dispersed throughout the system, and each terminal may be fixed or mobile. A terminal may also be called a mobile station, user equipment, a user device, or some other terminology. A terminal may be a wireless device, a cellular phone, a personal digital assistant (PDA), a wireless modem card, and so on. Each terminal 1520 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 1530 couples to base stations 1510 and provides coordination and control for base stations 1510. For a distributed architecture, base stations 1510 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

Figure 16:
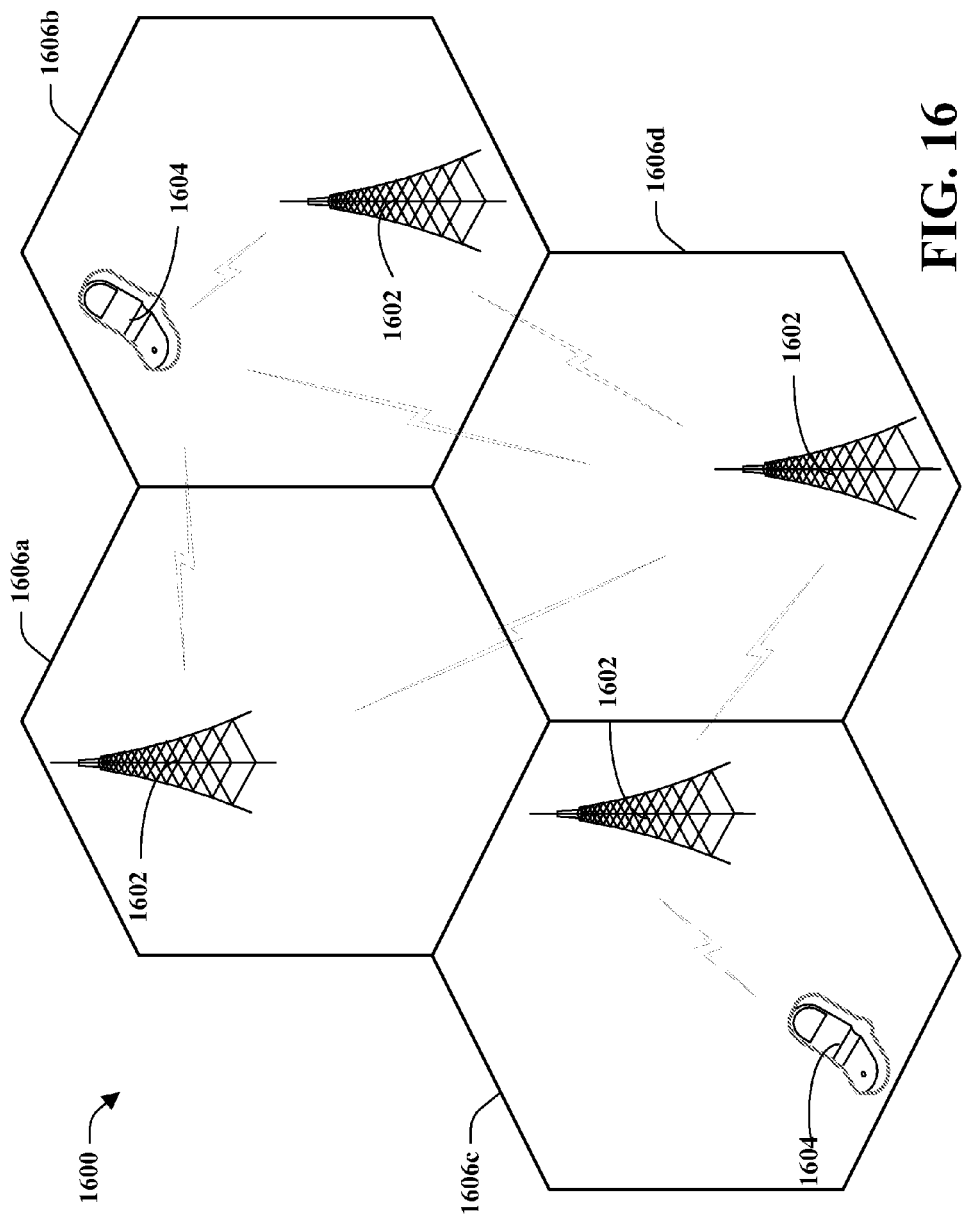
FIG. 16 is an illustration of an ad hoc or unplanned/semi-planned wireless communication environment in accordance with one or more aspects.

FIG. 16 is an illustration of an ad hoc or unplanned/semi-planned wireless communication environment 1600, in accordance with various aspects of the herein described echoing. System 1600 can comprise one or more base stations 1602 in one or more sectors that receive, transmit, repeat, etc., wireless communication signals to each other and/or to one or more mobile devices 1604. As illustrated, each base station 1602 can provide communication coverage for a particular geographic area, illustrated as three geographic areas, labeled 1606a, 1606b, 1606c, and 1606d. Each base station 1602 can comprise a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art. Mobile devices 1604 may be, for example, cellular phones, smart phones, laptops, handheld communication devices, handheld computing devices, satellite radios, global positioning systems, PDAs, and/or any other suitable device for communicating over wireless network 1600. System 1600 can be employed in conjunction with various aspects described herein in order for one MBSFN to reinforce another MBSFN.

Figure 17:
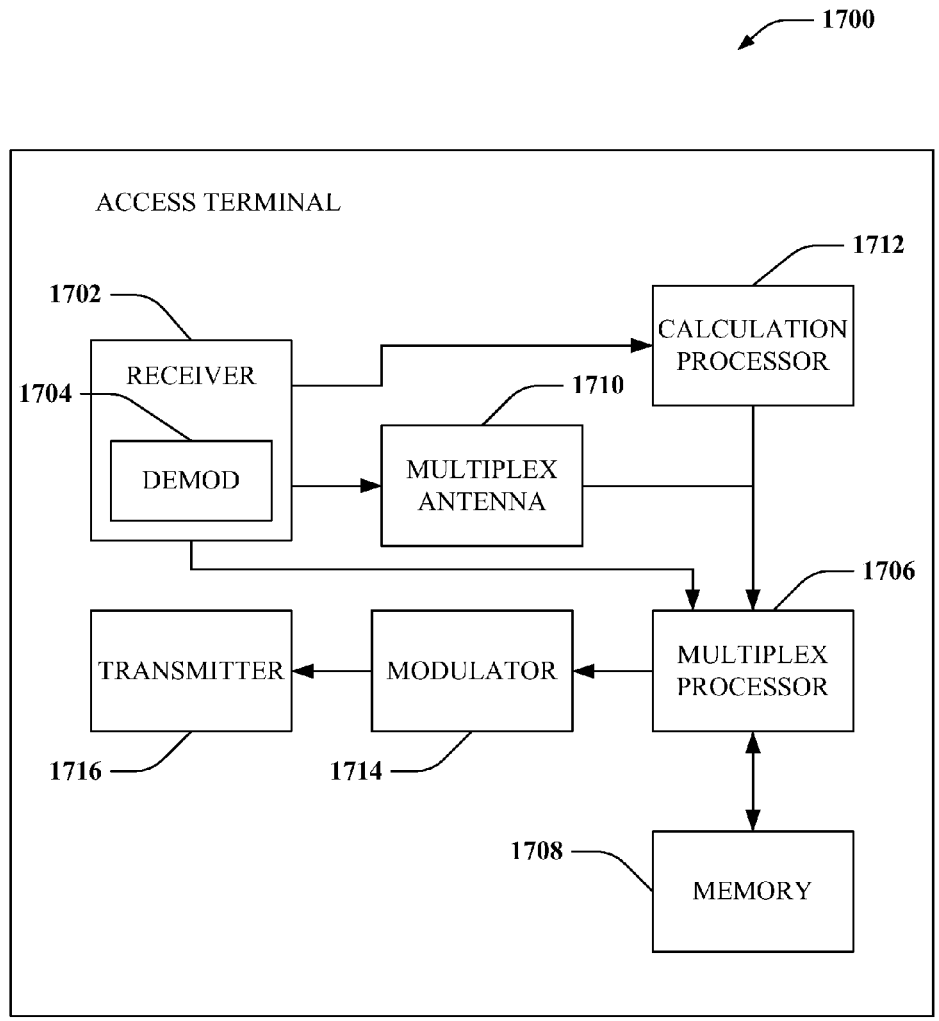
FIG. 17 depicts an exemplary access terminal that can provide feedback to communications networks, in accordance with one or more aspects.

FIG. 17 depicts an exemplary access terminal 1700 that can provide feedback to communications networks, in accordance with one or more aspects of the herein described echoing. Access terminal 1700 comprises a receiver 1702 (e.g., an antenna) that receives a signal and performs typical actions on (e.g., filters, amplifies, down converts, etc.) the received signal. Specifically, receiver 1702 can also receive a service schedule defining services apportioned to one or more blocks of a transmission allocation period, a schedule correlating a block of downlink resources with a block of uplink resources for providing feedback information as described herein, or the like. Receiver 1702 can comprise a demodulator 1704 that can demodulate received symbols and provide them to a processor 1706 for evaluation. Processor 1706 can be a processor dedicated to analyzing information received by receiver 1702 and/or generating information for transmission by a transmitter 1716. Additionally, processor 1706 can be a processor that controls one or more components of access terminal 1700, and/or a processor that analyzes information received by receiver 1702, generates information for transmission by transmitter 1716, and controls one or more components of access terminal 1700. Additionally, processor 1706 can execute instructions for interpreting a correlation of uplink and downlink resources received by receiver 1702, identifying un-received downlink block, or generating a feedback message, such as a bitmap, appropriate to signal such un-received block or blocks, or for analyzing a hash function to determine an appropriate uplink resource of a plurality of uplink resources, as described herein.

Access terminal 1700 can additionally comprise memory 1708 that is operatively coupled to processor 1706 and that may store data to be transmitted, received, and the like. Memory 1708 can store information related to downlink resource scheduling, protocols for evaluating the foregoing, protocols for identifying un-received portions of a transmission, for determining an indecipherable transmission, for transmitting a feedback message to an access point, and the like.

It will be appreciated that the data store (e.g., memory 1708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 1708 of the subject systems and methods is intended to comprise, without being limited to, these and any other suitable types of memory.

Receiver 1702 is further operatively coupled to multiplex antenna 1710 that can receive a scheduled correlation between one or more additional blocks of downlink transmission resources and a block of uplink transmission resources. A multiplex processor 1706 can include a multi-digit. Further, a calculation processor 1712 can receive a feedback probability function, wherein the function limits a probability that a feedback message is provided by access terminal 1700, as described herein, if the block of downlink transmission resources, or data associated therewith, is not received.

Access terminal 1700 still further comprises a modulator 1714 and a transmitter 1716 that transmits the signal to, for instance, a base station, an access point, another access terminal, a remote agent, etc. Although depicted as being separate from the processor 1706, it is to be appreciated that signal generator 1710 and indicator evaluator 1712 may be part of processor 1706 or a number of processors (not shown).

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications, and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for reusing idled radio resources in a wireless communication system, the method comprising:
   reusing idled radio resources in a multicast/broadcast single frequency network (MBSFN) inactive area including a plurality of cells to contribute to MBSFN transmission in an area adjacent the plurality of cells; and
   carrying additional transmissions in at least one of the plurality of cells,
   wherein the carrying additional transmissions in at least one of the plurality of cells comprises transmitting a service that the MBSFN does not advertise as having.

2. A method in accordance with claim 1 wherein the carrying additional transmissions in at least one of the plurality of cells comprises transmitting both a service that the MBSFN does not advertise as having and a service that the MBSFN does advertise as having.

3. A method in accordance with claim 1 wherein the carrying additional transmissions in at least one of the plurality of cells comprises transmitting a service that the MBSFN does not advertise as having but that the adjacent MBSFN does advertise as having.

4. A method in accordance with claim 1 wherein the carrying additional transmissions in at least one of the plurality of cells comprises transmitting a multimedia broadcast and multicast service (MBMS) service that the MBSFN does not advertise as having.

5. A method in accordance with claim 1 wherein the carrying additional transmissions in at least one of the plurality of cells comprises transmitting a multimedia broadcast and multicast service (MBMS) service that the MBSFN does not advertise as having but that the adjacent MBSFN does advertise as having.

6. An apparatus for reusing idled radio resources in a wireless communication system, the apparatus comprising:
   means for reusing an idled radio resource in a multicast/broadcast single frequency network (MBSFN) inactive area including a plurality of cells to contribute to MBSFN transmission in an area adjacent the plurality of cells; and
   means for carrying additional transmissions in each of the plurality of cells,
   wherein the means for carrying additional transmissions transmits a service that the MBSFN does not advertise as having.

7. The apparatus for reusing idled radio recourses in a wireless communication system of claim 6, wherein the means for carrying additional transmissions transmits both a service that the MBSFN does not advertise as having and a service that the MBSFN does advertise as having.

8. The apparatus for reusing idled radio recourses in a wireless communication system of claim 6, wherein the means for carrying additional transmissions transmits a service that the MBSFN does not advertise as having but that the adjacent MBSFN does advertise as having.

9. The apparatus for reusing idled radio recourses in a wireless communication system of claim 6, wherein the means for carrying additional transmissions transmits a multimedia broadcast and multicast service (MBMS) service that the MBSFN does not advertise as having.

10. The apparatus for reusing idled radio recourses in a wireless communication system of claim 6, wherein the means for carrying additional transmissions transmits a multimedia broadcast and multicast service (MBMS) service that the MBSFN does not advertise as having but that the adjacent MBSFN does advertise as having.

11. A non-transitory computer program product comprising a computer-readable medium including codes stored thereon for causing a computer to:
    reuse an idled radio resource in a multicast/broadcast single frequency network (MBSFN) inactive area including a plurality of cells to contribute to MBSFN transmission in an area adjacent the plurality of cells,
    wherein the codes include codes for causing the computer to:
    carry additional transmissions in at least one of the plurality of cells,
    carry the additional transmissions in at least one of the plurality of cells by transmitting a service that the MBSFN does not advertise as having.

12. The non-transitory computer program product of claim 1, wherein the codes include codes for causing the computer to:
    carry the additional transmissions in at least one of the plurality of cells by transmitting both a service that the MBSFN does not advertise as having and a service that the MBSFN does advertise as having.

13. The non-transitory computer program product of claim 11, wherein the codes include codes for causing the computer to:
    carry the additional transmissions in at least one of the plurality of cells by transmitting a service that the MBSFN does not advertise as having but that the adjacent MBSFN does advertise as having.

14. The non-transitory computer program product of claim 11, wherein the codes include codes for causing the computer to:
    carry the additional transmissions in at least one of the plurality of cells by transmitting a multimedia broadcast and multicast service (MBMS) service that the MBSFN does not advertise as having.

15. The non-transitory computer program product of claim 11, wherein the codes include codes for causing the computer to:
    carry the additional transmissions in at least one of the plurality of cells by transmitting a multimedia broadcast and multicast service (MBMS) service that the MBSFN does not advertise as having but that the adjacent MBSFN does advertise as having.

16. An apparatus for reusing idled radio resources in a wireless communication system, the apparatus comprising:
    a memory;
    a processor coupled to the memory, the processor configured to:
    reuse an idled radio resource in a multicast/broadcast single frequency network (MBSFN) inactive area including a plurality of cells to contribute to MBSFN transmission in an area adjacent the plurality of cells; and
    carry additional transmissions in each of the plurality of cells,
    wherein the processor is configured to carry the additional transmissions in each of the plurality of cells by transmitting a service that the MBSFN does not advertise as having.

17. The apparatus for reusing idled radio recourses in a wireless communication system of claim 16, wherein the processor is configured to carry the additional transmissions in each of the plurality of cells by transmitting both a service that the MBSFN does not advertise as having and a service that the MBSFN does advertise as having.

18. The apparatus for reusing idled radio recourses in a wireless communication system of claim 16, wherein the processor is configured to carry the additional transmissions in each of the plurality of cells by transmitting a service that the MBSFN does not advertise as having but that the adjacent MBSFN does advertise as having.

19. The apparatus for reusing idled radio recourses in a wireless communication system of claim 16, wherein the processor is configured to carry the additional transmissions in each of the plurality of cells by transmitting a multimedia broadcast and multicast service (MBMS) service that the MBSFN does not advertise as having.

20. The apparatus for reusing idled radio recourses in a wireless communication system of claim 16, wherein the processor is configured to carry the additional transmissions in each of the plurality of cells by transmitting a multimedia broadcast and multicast service (MBMS) service that the MBSFN does not advertise as having but that the adjacent MBSFN does advertise as having.

* * * * *